(12) United States Patent
Choi et al.

(10) Patent No.: US 12,456,900 B2
(45) Date of Patent: Oct. 28, 2025

(54) DIRECT SLOT COOLING SYSTEM FOR MOTORS

(71) Applicant: KYUNGPOOK NATIONAL UNIVERSITY INDUSTRY—ACADEMIC COOPERATION FOUNDATION, Daegu (KR)

(72) Inventors: Hong Soon Choi, Yongin-si (KR); Il Seouk Park, Daegu (KR); Chang Hoon Seok, Daegu (KR); Jun Beom Park, Daegu (KR); Gui Hwan Kim, Daegu (KR); Jong Hui Lee, Daegu (KR); Jong Hyeon Son, Pohang-si (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 259 days.

(21) Appl. No.: 18/050,312

(22) Filed: Oct. 27, 2022

(65) Prior Publication Data

US 2023/0155446 A1    May 18, 2023

(30) Foreign Application Priority Data

Oct. 29, 2021    (KR) .......................... 10-2021-0147076

(51) Int. Cl.
| | |
|---|---|
| *H02K 5/20* | (2006.01) |
| *H02K 3/24* | (2006.01) |
| *H02K 5/173* | (2006.01) |
| *H02K 7/08* | (2006.01) |
| *H02K 9/197* | (2006.01) |
| *H02K 21/16* | (2006.01) |

(52) U.S. Cl.
CPC ............... *H02K 5/203* (2021.01); *H02K 3/24* (2013.01); *H02K 5/1732* (2013.01); *H02K 7/083* (2013.01); *H02K 9/197* (2013.01); *H02K 21/16* (2013.01)

(58) Field of Classification Search
CPC ............. H02K 3/24; H02K 5/203; H02K 5/20
See application file for complete search history.

(56) References Cited

U.S. PATENT DOCUMENTS

| | | | | |
|---|---|---|---|---|
| 2003/0062780 | A1* | 4/2003 | Kaneko | ..................... H02K 3/24 310/58 |
| 2024/0204584 | A1* | 6/2024 | Ito | .......................... H02K 9/197 |

FOREIGN PATENT DOCUMENTS

| | | |
|---|---|---|
| DE | 102020101316 A1 * | 7/2021 |
| JP | 2002-186211 A | 6/2002 |

(Continued)

OTHER PUBLICATIONS

Office Action issued May 15, 2023 in Korean Application No. 10-2021-0147076.

*Primary Examiner* — Sean Kayes
(74) *Attorney, Agent, or Firm* — Sughrue Mion, PLLC

(57) ABSTRACT

Disclosed is a direct slot cooling system for motors, including a stator configured to expand an inner slot space of a stator core where a coil is wound to form a cooling slot through which a cooling fluid passes; a rotor coupled to a center of the stator to rotate; and a housing coupled to left and right sides of the stator to form a cooling jacket in watertight communication with a cooling slot so that a cooling fluid circulates in the cooling jacket.

8 Claims, 8 Drawing Sheets

(56) References Cited

FOREIGN PATENT DOCUMENTS

| | | | |
|---|---|---|---|
| JP | 2002-247813 | A | 8/2002 |
| JP | 2003-164088 | A | 6/2003 |
| JP | 2004-48878 | A | 2/2004 |
| JP | 2004-289917 | A | 10/2004 |
| KR | 10-1792915 | B1 | 11/2017 |

* cited by examiner

[FIG. 1]
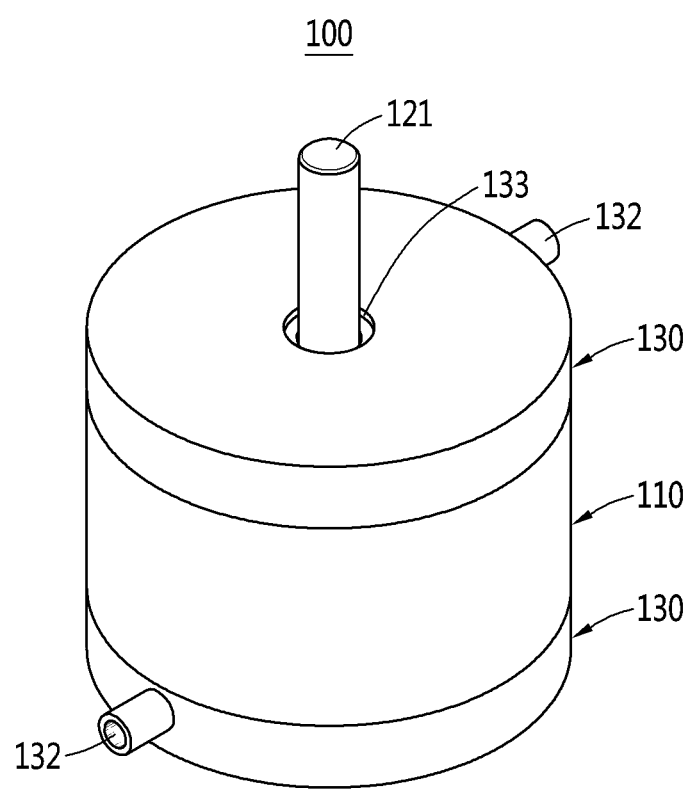

[FIG. 2]
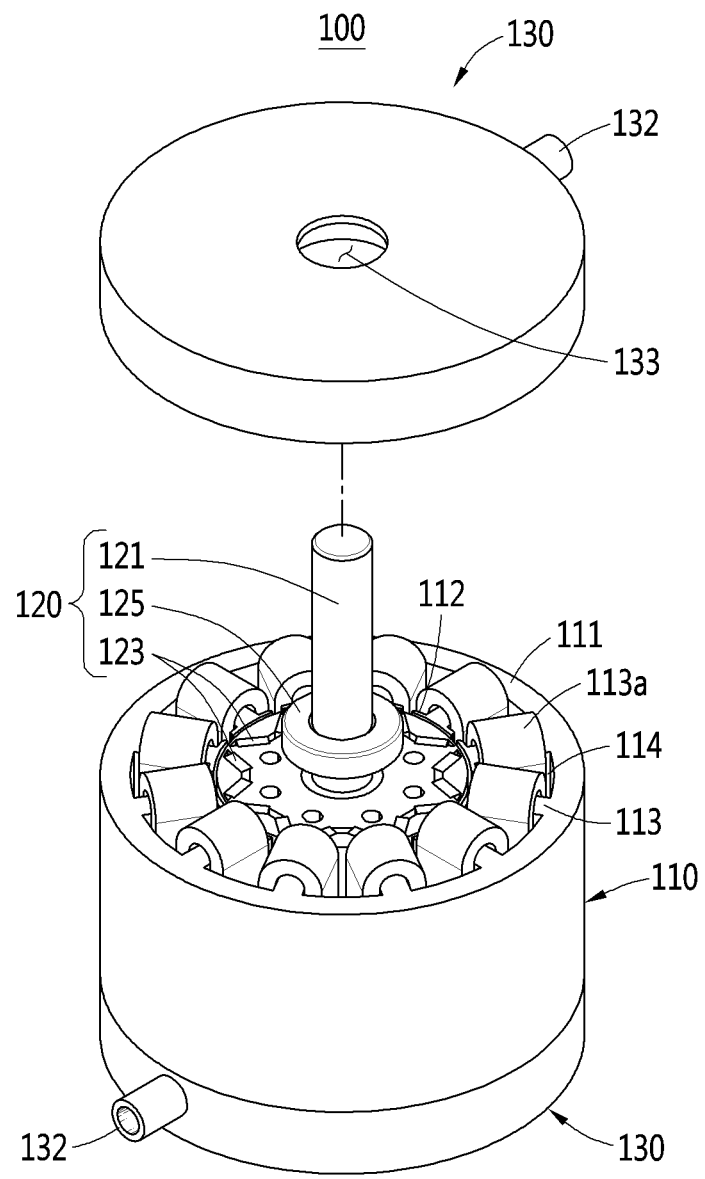

[FIG. 3]
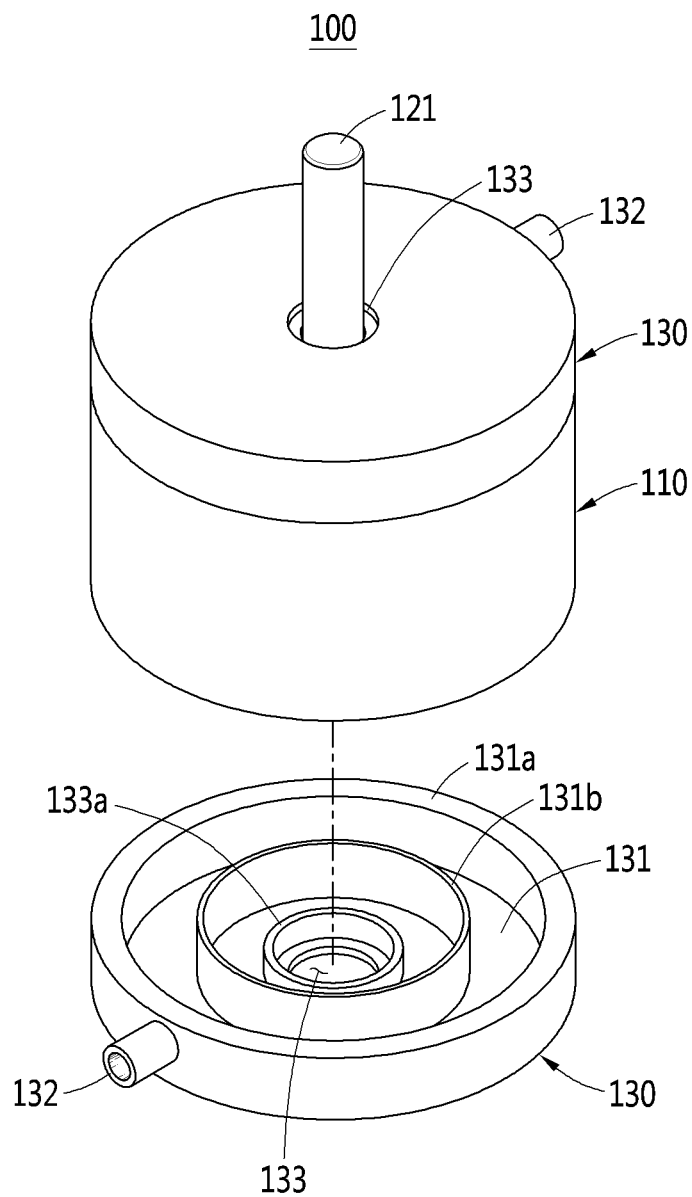

[FIG. 4]
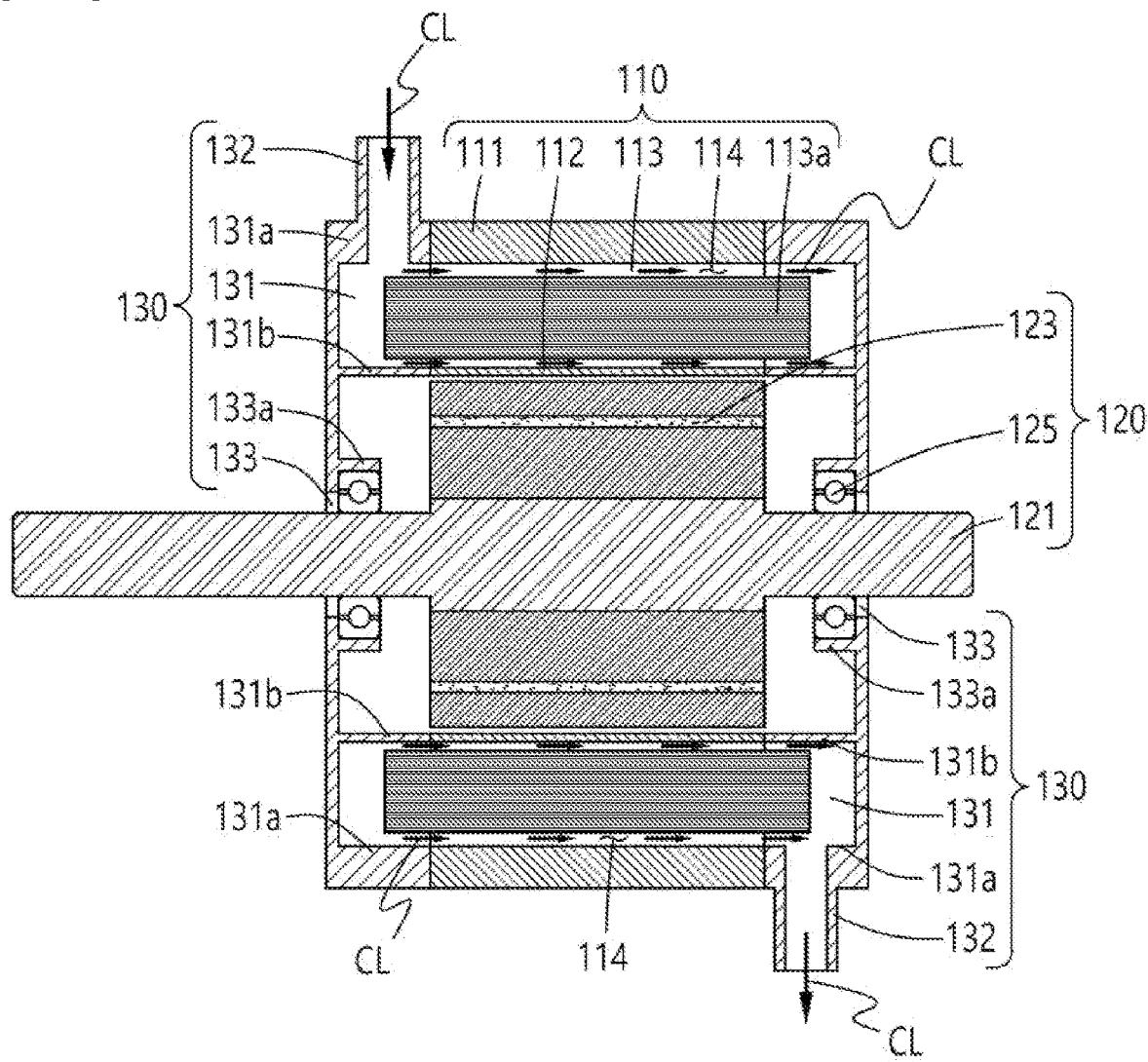

[FIG. 5]
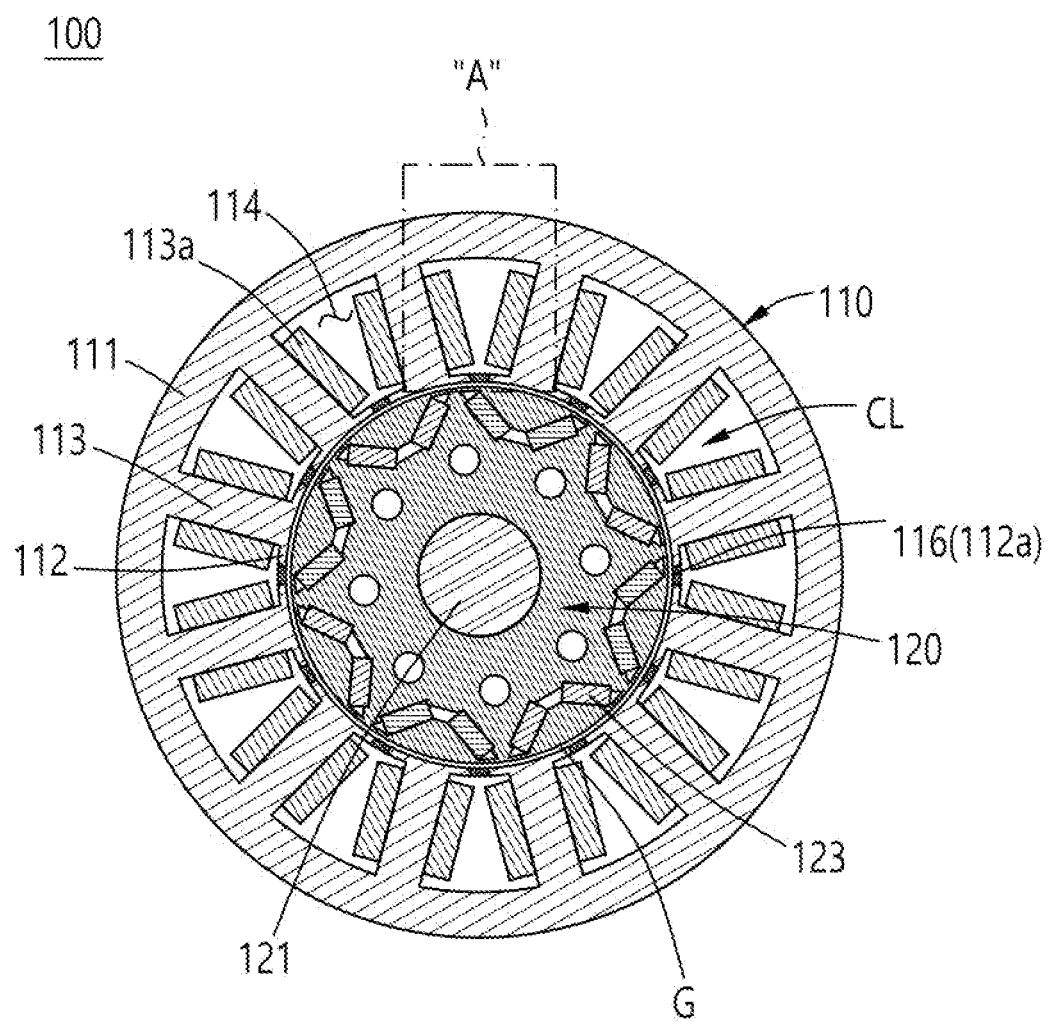

[FIG. 6A]
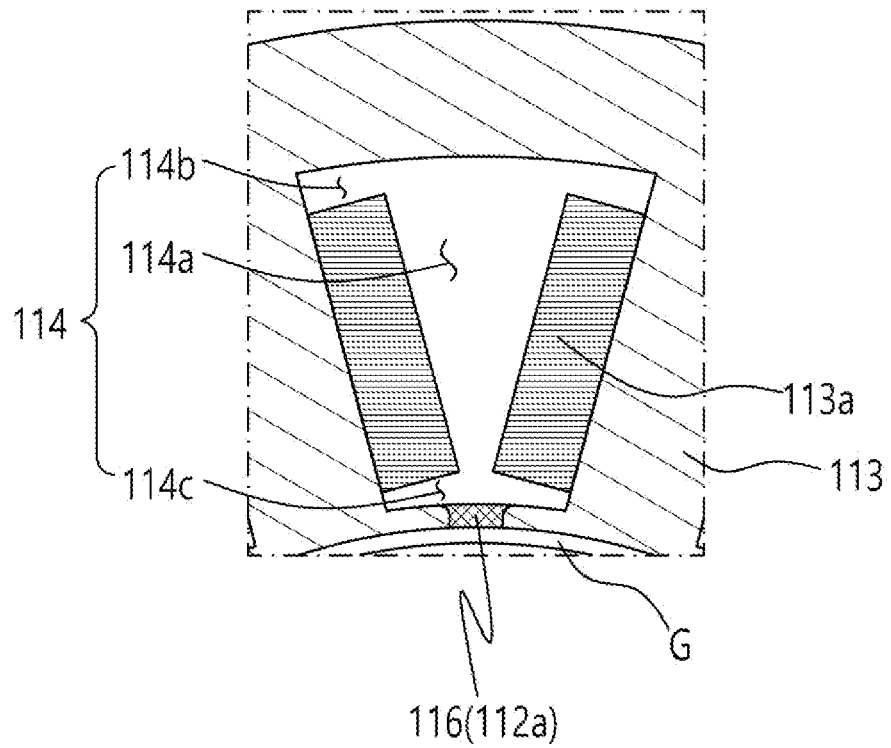
[FIG. 6B]
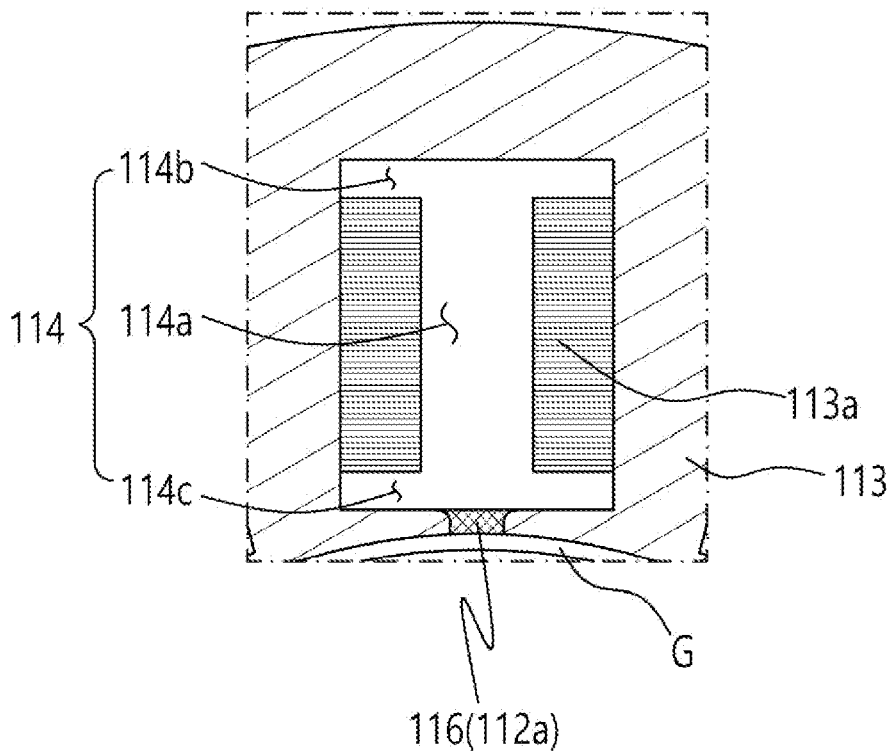

[FIG. 6C]
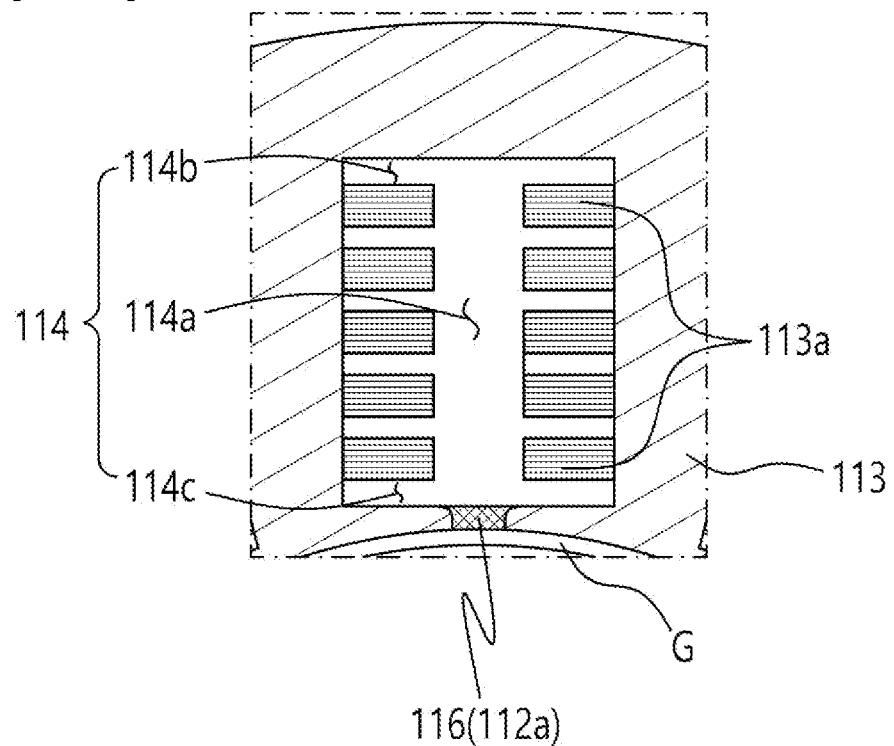
[FIG. 6D]
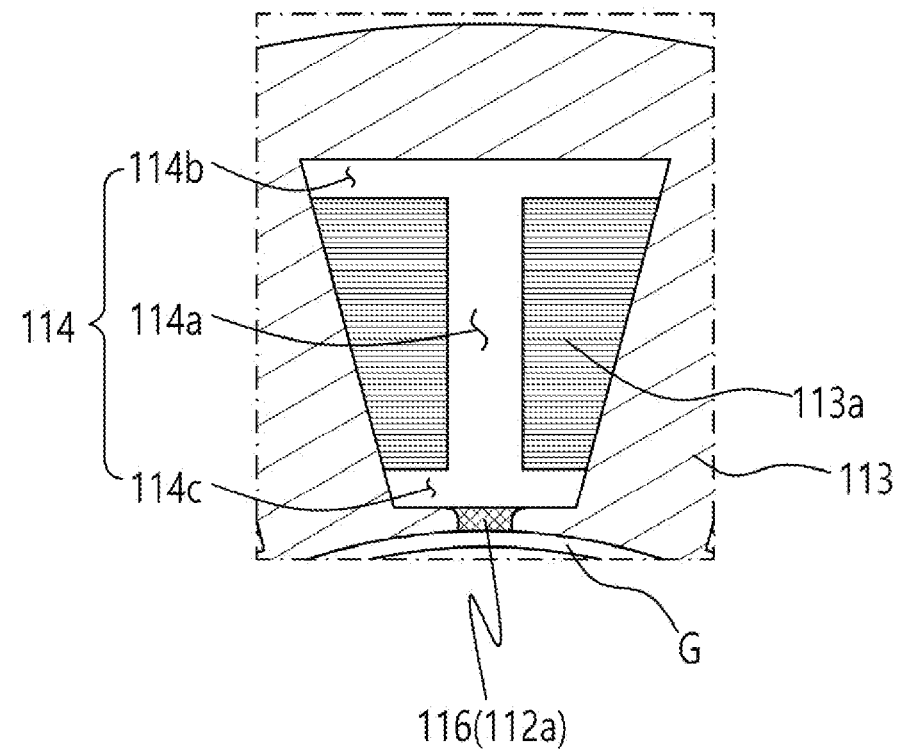

[FIG. 7A]
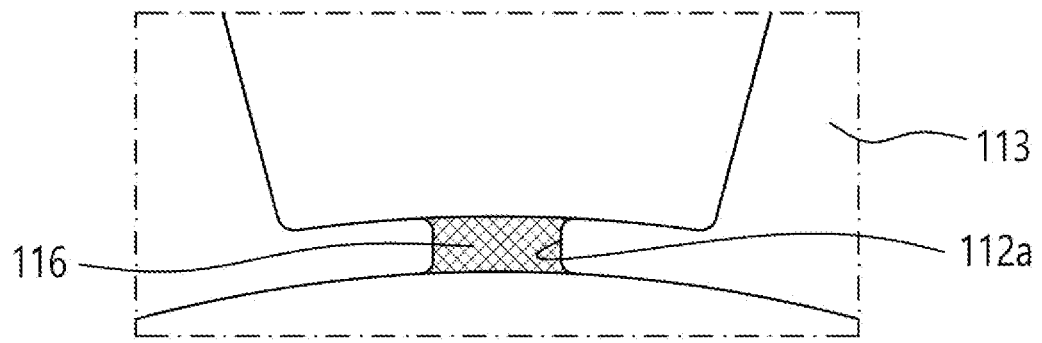
[FIG. 7B]
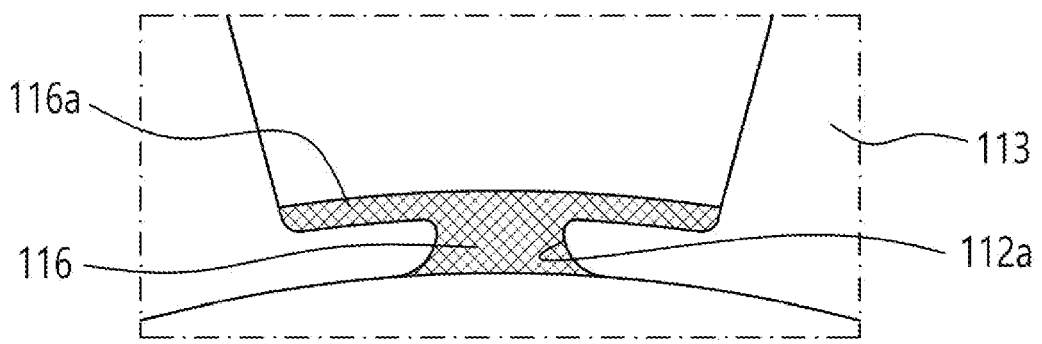
[FIG. 7C]
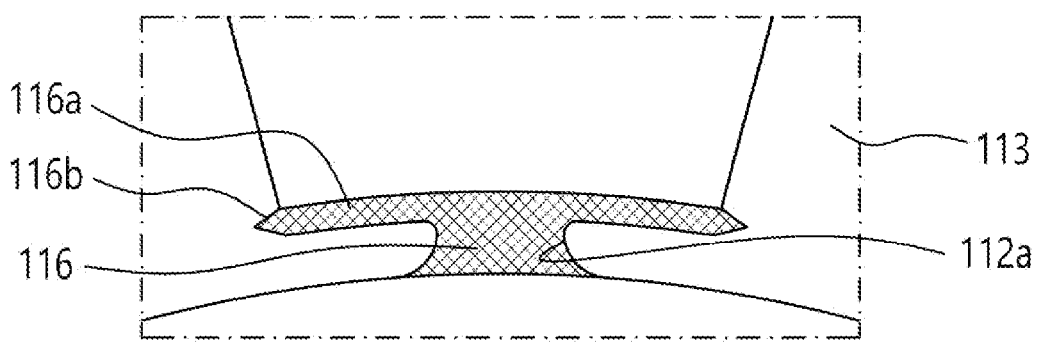

DIRECT SLOT COOLING SYSTEM FOR MOTORS

CROSS-REFERENCE TO RELATED APPLICATION

This application claims the priority benefit of Korean Patent Application No. 10-2021-0147076, filed on Oct. 29, 2021, in the Korean Intellectual Property Office, the disclosure of each of which is incorporated herein by reference.

BACKGROUND OF THE DISCLOSURE

Field of the Disclosure

The present disclosure relates to a direct slot cooling system for motors, and more particularly, to a direct slot cooling system for motors configured to form a cooling slot by expanding an inner space of a slot where a coil is wound so that heat emitted from a heat source (coil) can be effectively discharged by circulating a cooling fluid directly and the entire coil wound in the slot can directly exchange heat with the cooling fluid.

Description of the Related Art

In general, a motor consists of a stator and a rotor. As current flows through windings wound around the stator to form a rotating magnetic field, the rotor rotates to generate power. Heat is generated inside the motor due to electrical loss caused by current flowing through the windings, iron loss due to the rotating magnetic field caused by the rotation of the motor, and mechanical loss. If proper cooling for such heat is not performed, internal insulation is deteriorated, resulting in problems such as insulation damage.

A technique for solving such an existing problem is disclosed in Korean Patent Publication No. 2014-0011449 entitled "stator coil direct cooling type motor."

In the existing technology, a cooling fluid path is mainly formed in a motor housing so as to cool heat generated in a stator coil so that a refrigerant absorbs the generated heat.

In an example of an existing motor cooling structure, first, a cooling water inlet and a plurality of cooling water guide protrusions are formed at one end of a motor housing in a circumferential direction, and a cooling water path is formed along the circumference of the motor housing and connected to the cooling water outlet. In addition, a plurality of heat dissipation fins is disposed in a circumferential direction in an inner space of the motor housing in which the stator and the rotor are disposed.

However, the cooling structure implemented in the motor housing according to the existing technology does not directly cool the stator coil, but adopts an indirect cooling method by heat dissipation fins using heat conduction and air inside the motor housing, so that there is a limit to effectively cooling the heat generated by the stator coils.

RELATED ART DOCUMENT

Patent Document (Patent Document 0001) Korean Patent No. 10-1792915

SUMMARY OF THE DISCLOSURE

Therefore, the present disclosure has been made in view of the above problems, and it is an object of the present disclosure to form a cooling slot by expanding an inner space of a slot where a coil is wound so that heat emitted from a heat source (coil) can be effectively discharged by circulating a cooling fluid directly and the entire coil wound in the slot can directly exchange heat with the cooling fluid.

It is another object of the present disclosure to optimize heat exchange efficiency by smoothly flowing a cooling fluid when a remaining space is formed as a cooling slot by setting the proportion of the cross-sectional area of a coil in a slot area to about 20% to 80%.

It is yet another object of the present disclosure to adjust the flow rate of the cooling fluid according to the specific gravity, occupied by the cross-sectional area of the coil in the slot area, and the amount of heat from the coil.

In accordance with an aspect of the present invention, the above and other objects can be accomplished by the provision of a direct slot cooling system for motors, including: a stator configured to expand an inner slot space of a stator core where a coil is wound to form a cooling slot through which a cooling fluid passes; a rotor coupled to a center of the stator to rotate; and a housing coupled to left and right sides of the stator to form a cooling jacket in watertight communication with a cooling slot so that a cooling fluid circulates in the cooling jacket.

In addition, in the stator, a plurality of teeth may be radially arranged at equal intervals in an inner direction of a stator core, a stator coil may be wound around each of the teeth, a T-shaped extension end extending to left and right sides may be formed at an inner end of each of the teeth, and a wedge member may be inserted between the T-shaped extension end to seal and watertight maintain an inside thereof to form a cooling slot.

In addition, the cooling slot may include a central flow path provided between the coils, an inner flow path configured to communicate inside a concentric circle of the central flow path and to flow between a T-shaped extension end and the coil, and an outer flow path configured to communicate outside the concentric circle of the central flow path and to flow between an inner surface of the stator core and the coil.

Here, a ratio of a cross-sectional area of the coil to the slot area may be 20% to 80%.

In addition, when the stator core is formed by overlapping thin metal plates, coating may be performed using a synthetic resin such that a cooling fluid does not leak into a surface where the core is in contact with a passage space where the coil is wound.

In addition, a shaft may be axially coupled to a center of a body of the rotor, magnetics may be magnetized around an outer body of the shaft, and opposite ends of a shaft of the rotor may be axially coupled to a housing using a bearing.

In addition, the housing may be coupled to opposite ends of the stator to form a donut-shaped cooling jacket communicating with the cooling slot of the stator, and the cooling jacket is connected to a cooling oil inlet port.

Here, a shaft hole through which a shaft passes may be formed in a center of a body of the housing, and a bearing receiver in which a bearing is accommodated may be formed around the shaft hole.

Here, the cooling jacket may be formed between a first rim and a second rim, wherein the first rim is watertight bonded to an end of a stator core on side of the stator and the second rim is watertight bonded to an extended end on side of the stator.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 illustrates a perspective view of an electric motor according to the present disclosure;

FIGS. 2 and 3 illustrate an exploded perspective view of an electric motor according to the present disclosure;

FIG. 4 illustrates a longitudinal sectional view of an electric motor to which a direct slot cooling system according to the present disclosure is applied;

FIG. 5 illustrates a cross-sectional view of an electric motor to which a direct slot cooling system according to the present disclosure is applied;

FIGS. 6A to 6D illustrate embodiments of a modified cooling slot form and coil winding form of the present disclosure; and FIGS. 7A-7C illustrate modified examples of a wedge member of the present disclosure.

DETAILED DESCRIPTION OF THE DISCLOSURE

Specific structural and functional descriptions of embodiments according to the concept of the present disclosure disclosed herein are merely illustrative for the purpose of explaining the embodiments according to the concept of the present disclosure. Furthermore, the embodiments according to the concept of the present disclosure can be implemented in various forms and the present disclosure is not limited to the embodiments described herein.

The embodiments according to the concept of the present disclosure may be implemented in various forms as various modifications may be made. The embodiments will be described in detail herein with reference to the drawings. However, it should be understood that the present disclosure is not limited to the embodiments according to the concept of the present disclosure, but includes changes, equivalents, or alternatives falling within the spirit and scope of the present disclosure.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the scope of rights according to the concept of the present invention.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" in the specification should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure will now be described more fully with reference to the accompanying drawings, in which exemplary embodiments of the invention are shown. This disclosure may, however, be embodied in many different forms and should not be construed as limited to the exemplary embodiments set forth herein. Like reference numerals in the drawings denote like elements.

FIG. 1 illustrates a perspective view of an electric motor according to the present disclosure, FIGS. 2 and 3 illustrate an exploded perspective view of an electric motor according to the present disclosure, and FIG. 4 illustrates a longitudinal sectional view of an electric motor to which a direct slot cooling system according to the present disclosure is applied.

As shown in the drawings, the electric motor (e.g., motor) to which the direct slot cooling system according to the present disclosure is applied is largely composed of a stator 110, a rotor 120, and a housing 130.

In the stator 110, a plurality of teeth 113 are radially arranged at equal intervals in an inner direction of a stator core 111.

In addition, a stator coil 113a is wound around the teeth 113, and an electromagnetic field in which current flows in a coil 113a is formed.

A T-shaped extension end 112 extending to left and right sides may be formed at an inner end of each of the teeth 113.

In addition, the teeth 113 may form a smooth end without the T-shaped extension end 112.

Here, a winding hole (slot open) 112a is formed between the T-shaped extension end 112 to serve as a passage for a coil 113a to be wound on the teeth 113. In addition, the winding hole 112a plays the role of an inner wall forming a cooling slot 114 by inserting a wedge member 116 into the winding hole 112a between the T-shaped extension end 112 and sealing the inside to keep watertight.

Here, the shape of the wedge member 116 forms an I-shaped cross-section that fits snugly into the winding hole (slot open) 112a as shown in FIG. 7A, or forms a T-shaped cross-section with a cover surface 116a spanning the top surface of the T-shaped extension end 112 directed toward the cooling slot 114 as shown in FIG. 7B.

In addition, the wedge member 116 may include protrusions 116b further extending from opposite sides of the cover surface 116a to slightly dig into each of the teeth 113, thereby forming a T-shaped cross-section, as shown in FIG. 7C.

That is, the present disclosure proposes a way to utilize an inner slot space of the stator core 111, where the coil 113a is wound, as the cooling slot 114, and for this, the present disclosure expands the slot inside of the stator 110 to form the cooling slot 114.

This is to ensure rapid cooling through heat exchange by directly contacting a cooling fluid with the coil 113a that generates the maximum heat in the motor.

FIG. 5 illustrates a cross-sectional view of an electric motor to which a direct slot cooling system according to the present disclosure is applied, and FIGS. 6A-6D illustrate enlarged views of part "A" of FIG. 5.

As shown in the drawings, the cooling slot 114 includes a central flow path 114a provided between the coils 113a on opposite sides, an inner flow path 114b that communicates inside a concentric circle of the central flow path 114a and flows between the T-shaped extension end 112 and the coil 113a, and an outer flow path 114c that communicates outside the concentric circle of the central flow path 114a and flows between the inner surface of the stator core 111 and the coil 113a.

However, the shape of the cooling slot 1114 is not limited only to the shape of the accompanying drawings and may be transformed into various shapes depending upon the way in which the coil 113a is wound, and the shape of the teeth 113.

An embodiment of the shape is described with reference to FIGS. 6A to 6D.

FIGS. 6A to 6D illustrate embodiments of a modified cooling slot form and coil winding form of the present disclosure. FIG. 6A illustrates an embodiment wherein the coil 113a has a rectangular cross-section and the overall shape of the cooling slot 114 and the central flow path 114a is manufactured to have a fan shape.

In addition, FIG. 6B illustrates an embodiment wherein the coil 113a has a rectangular cross-section and the overall shape of the cooling slot 114 and the central flow path 114a is manufactured to have a rectangular shape.

In addition, FIG. 6C illustrates an embodiment wherein the coil 113a is divided into a plurality of groups and wound, the cross-section of each coil has a rectangular shape to be spaced apart from each other, and the overall shape of the cooling slot 114 and the shape of the central flow path 114a are manufactured to have a rectangular shape.

In addition, FIG. 6D illustrates an embodiment wherein the cross-section of the coil 113a has a trapezoidal shape, and the overall shape of the cooling slot 114 has a trapezoidal shape while the central flow path 114a is manufactured in a rectangular shape.

As such, the cooling slot 114 of the present invention may be deformed and manufactured in various forms, but as a common feature, it is designed so that the proportion of the cross-sectional area of the coil in the slot area is 20% to 80% so as to optimize heat exchange efficiency by smoothly flowing a cooling fluid when a remaining space of the slot is formed as a cooling channel.

Forming the cooling slot 114 in such a ratio does not significantly expand the size of the motor compared to existing cases, but when the cooling slot 114 is formed, may optimize heat exchange efficiency by smoothly flowing a cooling fluid CL.

The stator core 111 as described above forms a stator with a desired thickness by layering several thin metal plates. Here, a watertight method such as coating using a synthetic resin may be used to prevent the cooling fluid CL from leaking between the metal plate bodies.

The rotor 120 is installed in the center of the stator 110 as shown in FIGS. 1 to 5.

A shaft 121 is axially coupled to the center of the body of the rotor 120, and magnetics 123 are magnetized around the outer body of the shaft 121 to form a magnetic field corresponding to the side of the stator 110.

The rotor body 120 and the stator 110 are installed to maintain a gap G therebetween.

Opposite ends of the shaft 121 of the rotor 120 are coupled to the housing 130 in a watertight structure using gaskets on the left and right sides of the stator 110 using bearings 125 to guide shaft rotation.

Hereinafter, the housing 130 is described in detail.

The housings 130 are manufactured in a circular cap shape, and a pair of housings 130 facing each other have the same structure. Accordingly, each of the housings 130 is described using the same reference numerals.

The housings 130 are respectively coupled to opposite ends of the stator 110 on a back surface of each of the housings 130 to form a donut-shaped cooling jacket 131 that communicates with the cooling slot 114 of the stator 110.

The cooling jacket 131 is formed between the second rim 131a and the second rim 131b, the second rim 131a is watertight joined to an end of the stator core 111 on the side of the stator 110, and the second rim 131b is watertight joined by the T-shaped extension end 112 and the wedge member 116 on the side of the stator 110.

Here, the cooling jacket 131 is connected to the cooling oil inlet ports 132 so that a cooling fluid CL circulates the cooling jacket 131 while entering and exiting the cooling jacket 131 by a hydraulic pump, etc.

As for the cooling oil inlet ports 132, one is an inlet port and the other is an outlet port, so the inlet and outlet directions may be changed.

A shaft hole 133 through which the shaft 121 passes is formed in the center of the housing 130, and a bearing receiver 133a in which a bearing 125 is accommodated is formed around the shaft hole 133.

The second rim 131b of the housing 130 is watertight joined to the T-shaped extension end 112 and the wedge member 116 of the stator 110, thereby preventing the cooling fluid CL in the cooling slot 114 from leaking to the rotor 120 side.

For such a watertight structure, a sealing treatment is also made between the T-shaped extension end 112 to which the wedge member 116 for blocking a slot open is coupled, and the sealing treatment is also made between the sheets of the stator core 111 forming the stator 110.

By the present invention, direct and rapid cooling can be achieved by allowing the cooling fluid CL to pass between the coils 113a where high heat is generated. Here, the cooling fluid CL may be insulating oil or insulating water.

In addition, the slot cooling system of the present invention may be applied to industrial motors and electric vehicle motors used in general industrial fields.

As described above, the present invention expands the inner space of the slot where the coil is wound to form a cooling slot, so that the heat emitted from the heat source (coil) can be effectively discharged by circulating the cooling fluid directly, and, since the entire coil wound in the slot directly exchanges heat with the cooling fluid, very high cooling performance is exhibited.

The present disclosure forms a cooling slot by expanding an inner space of a slot where a coil is wound so that heat emitted from a heat source (coil) can be effectively discharged by circulating a cooling fluid directly and the entire coil wound in the slot can directly exchange heat with the cooling fluid, thereby exhibiting very high cooling performance.

The present disclosure can maximize the contact between the coil and the cooling fluid when a remaining space is formed as a cooling slot by setting the proportion of the cross-sectional area of a coil in a slot area to about 20% to 80% and can optimize heat exchange efficiency by smoothly flowing the cooling fluid.

Although the present invention has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

DESCRIPTION OF SYMBOLS

110: stator
111: stator core
112: T-shaped extension end
112a: winding hole
113: teeth
113a: stator coil
114: cooling slot
114a: central flow path
114b: inner flow path
114c: outer flow path
116: wedge member
120: rotor
121: shaft
123: magnetics
125: bearing
130: housing
131: cooling jacket
131a: first rim
131b: second rim
132: cooling oil inlet port
133: shaft hole
133a: bearing receiver
CL: cooling fluid
G: gap

What is claimed is:

1. A direct slot cooling system for motors, comprising:
a stator configured to expand an inner slot space of a stator core where a coil is wound to form a cooling slot through which a cooling fluid passes;
a rotor coupled to a center of the stator to rotate; and
a housing coupled to left and right sides of the stator to form a cooling jacket in watertight communication with a cooling slot so that a cooling fluid circulates in the cooling jacket,
wherein the cooling slot comprises a central flow path provided between the coils, an inner flow path configured to communicate inside a concentric circle of the central flow path and to flow between a T-shaped extension end and the coil, and an outer flow path configured to communicate outside the concentric circle of the central flow path and to flow between an inner surface of the stator core and the coil.

2. The direct slot cooling system according to claim 1, wherein, in the stator, a plurality of teeth are radially arranged at equal intervals in an inner direction of a stator core, a stator coil is wound around each of the teeth, a T-shaped extension end extending to left and right sides is formed at an inner end of each of the teeth, and a wedge member is inserted between the T-shaped extension end to seal and water tightly maintain an inside thereof to form a cooling slot.

3. The direct slot cooling system according to claim 2, wherein, when the stator core is formed by overlapping thin metal plates, coating is performed using a synthetic resin such that a cooling fluid does not leak into a surface where the core is in contact with a passage space where the coil is wound.

4. The direct slot cooling system according to claim 1, wherein a ratio of a cross-sectional area of the coil to the slot area is 20% to 80%.

5. The direct slot cooling system according to claim 1, wherein a shaft is axially coupled to a center of a body of the rotor, magnetics are magnetized around an outer body of the shaft, and opposite ends of a shaft of the rotor are axially coupled to a housing using a bearing.

6. The direct slot cooling system according to claim 1, wherein the housing is coupled to opposite ends of the stator to form a donut-shaped cooling jacket communicating with the cooling slot of the stator, and the cooling jacket is connected to a cooling oil inlet port.

7. The direct slot cooling system according to claim 6, wherein a shaft hole through which a shaft passes is formed in a center of a body of the housing, and a bearing receiver in which a bearing is accommodated is formed around the shaft hole.

8. The direct slot cooling system according to claim 7, wherein the cooling jacket is formed between a first rim and a second rim, wherein the first rim is watertight bonded to an end of a stator core on side of the stator and the second rim is watertight bonded to an extended end on side of the stator.

* * * * *